United States Patent [19]
Schwalm

[11] Patent Number: 5,323,624
[45] Date of Patent: Jun. 28, 1994

[54] FILTERED ENVIRONMENTAL CONTROL SYSTEM

[75] Inventor: Gregory K. Schwalm, Granby, Conn.

[73] Assignee: United Technologies Corporation, Windsor Locks, Conn.

[21] Appl. No.: 976,112

[22] Filed: Nov. 13, 1992

[51] Int. Cl.⁵ .................... F25D 9/00; B01D 53/04
[52] U.S. Cl. .................................... 62/401; 62/86; 62/87; 62/402; 62/78
[58] Field of Search ................ 62/86, 87, 401, 402, 62/78; 55/58

[56] References Cited

U.S. PATENT DOCUMENTS

| | | | |
|---|---|---|---|
| 4,449,990 | 5/1984 | Tedford | 55/58 X |
| 4,665,715 | 5/1987 | Signoret | 62/402 |
| 4,769,051 | 9/1988 | Defrancesco | 55/179 |
| 4,829,775 | 5/1989 | Defrancesco | 62/402 X |
| 4,927,434 | 5/1990 | Cordes et al. | 95/15 |
| 4,963,174 | 10/1990 | Payne | 62/402 X |
| 4,967,565 | 11/1990 | Thomson et al. | 62/402 X |
| 4,983,190 | 1/1991 | Verrando et al. | 55/58 X |
| 5,015,271 | 5/1991 | Reiss | 55/58 X |
| 5,151,022 | 9/1992 | Emerson et al. | 62/401 X |
| 5,154,065 | 10/1992 | Herman | 62/401 |

Primary Examiner—Henry A. Bennet
Assistant Examiner—Christopher B. Kilner
Attorney, Agent, or Firm—William W. Habelt

[57] ABSTRACT

An air conditioning system (10), being powered by a supply of compressed air, includes an air cycle machine (12) and incorporates a pair of regenerable bed filters (44,46). In operation, the filters are alternately cycled in and out of service with one of the filters receiving pressurized air for filtration from the air cycle machine compressor (30), while a backflow of purge air is passed through the other filter to remove accumulated contaminants from the bed thereof, thereby regenerating the filter. The purge air comprises conditioned air from the air cycle machine turbine (32). The contaminant laden purge air discharging from the filter being cleansed, is passed to a subatmospheric pressure region (77) in the ram air duct (20) upstream of the air cycle machine fan (28) and downstream of the heat exchangers (22, 24) for venting therefrom to the atmosphere via the fan (28).

11 Claims, 1 Drawing Sheet

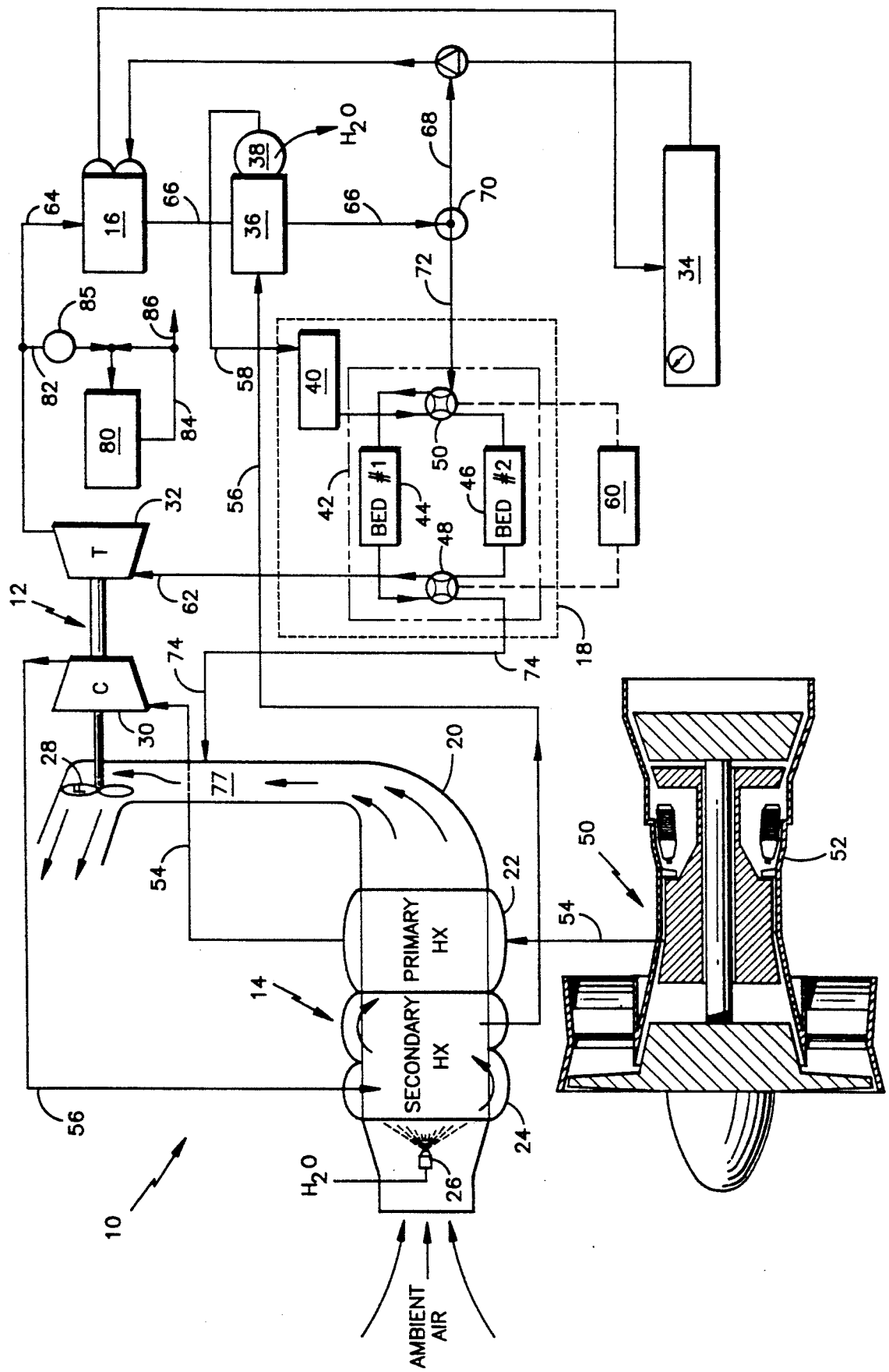

5,323,624

FILTERED ENVIRONMENTAL CONTROL SYSTEM

TECHNICAL FIELD

This invention relates to an environmental control system incorporating a regenerable filter system.

BACKGROUND ART

Air cycle environmental control systems are well known. Such systems are commonly used on aircraft for conditioning air, which may include pressuring, cooling and dehumidifying the air, for delivery to the aircraft passenger cabin and crew cockpit for occupant comfort. The conditioned air may also be supplied to the equipment bay for cooling sensitive equipment.

Air cycle environmental control systems generally employ an air cycle machine comprised of a fan, a compressor, and one or more turbines mounted for rotation on a common shaft, the turbine or turbines driving both the compressor and the fan. The air cycle machine is typically powered by compressed air which is bled from the compressor section of an engine or an auxiliary power unit. The compressed bleed air is further compressed in the compressor of the air cycle machine and thereafter expanded through the turbine or turbines thereby cooling the air and generally condensing moisture therein. The bleed air is also typically cooled prior to compression by passing it in heat exchange relationship with cold air, most commonly ram air from the atmosphere outside the aircraft, drawn through the heat exchanger by the fan of the air cycle machine. The air may be further cooled between the compression and expansion steps by again passing it in heat exchange relationship with the cold ram air. This air that has been expanded through the turbine constitutes the conditioned air that is delivered to the aircraft cabin, cockpit and equipment bays.

In certain aircraft applications, such as for example military aircraft, it is known to integrate an air filtration system with the air cycle environmental control system in order to protect the occupants and equipment within the closed environment of the aircraft from contaminants in the atmosphere from which the air to be conditioned is drawn. Such filtration systems typically utilize filters, such as for example single stage regenerative bed filters designed to remove chemical, biological and/or nuclear contaminants from the conditioning air.

Since such filters have a limited filtration life unless periodically cleansed, it is customary to incorporate a pair of parallel filters into the filtration system, with one filter being cleansed by purge air, while the other filter is in operation. An air cycle environmental control system incorporating such an air filtration system is disclosed in commonly assigned U.S. Pat. No. 4,769,051. In the system disclosed therein, the purge air used to cleanse the filters is dumped directly overboard with the contaminants removed from the filters during the backflow cleaning cycle. Although the use of backflow purge air to cleanse the filters has proven very effective in extending the useful filtration life of the filters, there is an overall efficiency loss associated with the additional turbine back pressure resulting from the pressure drop the purge air experiences in traversing the bed being purged and due to the pressure drop resulting from a flow restriction added to the occupant cabin cooling circuit to balance the splitting of the conditioned air flow between the cabin cooling circuit and the parallel purge air flow circuit.

DISCLOSURE OF INVENTION

It is an object of the invention to integrate a regenerable filtration system with an environmental control system to protect the inhabitants within an environment for extended periods of time.

It is a further object of the invention to integrate such filtration systems in environmental control systems while minimizing the power usage of the entire system.

The air cycle environmental control system of the present invention includes an air cycle machine for conditioning air for delivery to a closed enclosure, and a regenerable filter for removing contaminants from the conditioned air, the filter being purged of contaminants accumulating therein by passing a backflow of conditioned air therethrough. The air cycle machine comprises a fan, a compressor and at least one turbine, all mounted for rotation to a common shaft, the fan operative to draw a flow of cold air from the atmosphere through a heat exchanger associated with the air cycle machine. In accordance with the present invention, the purge air containing the accumulated contaminants removed from the filter is discharged to a subatmospheric pressure region for venting therefrom to the atmosphere. In a particular embodiment, the contaminated purge air is discharged to a subatmoshperic pressure region in the cold airduct upstream of the fan and vented to the atmosphere therefrom via the fan of the air cycle machine.

BRIEF DESCRIPTION OF DRAWING

These and other objects, features and advantages of the present invention will become more apparent in light of the following detailed description of a best mode embodiment thereof, as illustrated in the accompanying drawing, wherein the sole figure is a schematic depiction of a filtered environmental control system utilizing a regenerable filter in conjunction with an air cycle environmental control system on an aircraft.

BEST MODE FOR CARRYING OUT THE INVENTION

The filtered environmental control system 10 is depicted in the drawing as being utilized on an aircraft (not shown) for conditioning air bled from the compressor section 52 of an aircraft turbine engine 50 for supply as conditioned air, that is pressurized, cooled, dehumidified and filtered air, to an occupant enclosure 80. The conditioned air is also used to cool sensitive equipment (not shown) housed in an equipment bay 34. The filtered environmental control system 10 includes an air cycle machine 12, a heat exchanger means 14, a load heat exchange means 16, and a regenerable air filtration means 18.

The air cycle machine 12 is comprised of a fan 28, a compressor 30, and a turbine 32 coaxially mounted on a common shaft 33 for rotation at a common axis. The fan 28 draws the ambient air from the atmosphere outside the aircraft through the ram air duct 20. The heat exchange means 14 is disposed within the duct 20 upstream of the fan 28 and comprises a primary and a secondary heat exchanger 22 and 24, respectively. The relatively cold ram air drawn by the fan 28 through duct 20 traverses the heat exchangers 22 and 24 in indirect heat exchange relationship with relatively hot compressed air being conditioned thereby drawing heat therefrom to assist in cooling of that air. The fan 28 vents the ram air having traversed the heat exchange means 14 directly overboard into the atmosphere. As is known in the art, water may be sprayed into the secondary and primary heat exchanger by nozzle 26 to increase the cooling provided by the heat exchanger.

The compressor 30 further pressurizes the bleed air input to the system for use downstream thereof. The turbine 32 expands the bleed air to a lower pressure and a lower temperature by extracting energy from the air input thereto to rotatably drive the shaft 33, and the fan 28 and compressor 30 mounted thereto, as is well known in the art. A portion of the relatively cool air discharging from the turbine 32 is delivered to the occupant enclosure 80 as conditioned air to maintain the occupant enclosure at a desired pressure, temperature, and humidity, while the remainder of this air passes through the load heat exchanger in indirect heat exchange relationship with air from within the equipment bay 34, which advantageously is maintained as a closed environment, to extract heat therefrom, thereby cooling that air for recycle to the equipment bay 34. The regenerable filtration means 18 may be comprised of an aerosol particulate removal filter 40, and a twin bed pressure swing adsorption (PSA) nuclear biological chemical (NBC) filtration system, such as for example the PSA filtration system commercially available from the Pall Corporation, having offices in Glen Cove, N.Y. The filtration system, which is operative to filter compressed air, is comprised of a pair of regenerative bed NBC filters 44, 46, which are disposed in parallel relationship, and a plurality of valves 48, 50 (which are shown schematically). As in conventional systems, the environmental control system 10 includes an interstage heat exchanger 36 for cooling the compressed bleed air before the bleed air is expanded in the turbine 32. As illustrated, the heat exchanger 36 may comprise a condensing heat exchanger for sufficiently cooling the bleed air being conditioned to dehumidify the air by condensing water vapor therein. In such a case, a water collection means 38 is provided downstream of the heat exchanger 36 for removing the condensed water vapor before the bleed air is expanded in the turbine 32. Alternatively, the heat exchanger 36 may merely comprise a regenerative heat exchanger designed to cool the bleed air being conditioned, but not sufficiently to cause condensation of any water vapor in the air. In either case, any water vapor remaining in the cooled bleed air will be removed by the NBC filters 44, 46 before the bleed air is delivered to the turbine 32 to be expanded therein.

While one of the beds is in service for removing contaminants from the air being conditioned, the other bed is out of service and being purged of its accumulated contaminants. Whenever the operative bed is full of contaminants, or after a relatively safe time period of operation has passed, that bed is taken out of operation and the other bed is brought into operation, and the formerly operative bed is cleansed of its accumulated contaminants by backflowing purge air therethrough. This cycling of the beds alternately in and out of operation for decontamination is controlled in a conventional manner by a controller 60 and may continue indefinitely.

As compressed air is not required for decontaminating the regenerative beds of the filters 44 and 46, the conditioned air expanded in the turbine 32 and passed through the load exchanger 16 as the cooling medium therefor is passed as purge air through the bed to be cleansed, to remove the contaminants accumulated therein. The purge air discharging from the regenerative bed being decontaminated is laden with contaminants removed from the bed and, therefore, must be discharged overboard. By disposing the load heat exchanger 16 downstream of the turbine 32 and upstream of the filtration system 18, the maximum amount of cooling can be extracted from the air. Moreover, all the compressed air input to the environmental control system is used for cooling. None of the conditioned air is used for purging until its heat extracting ability has been exploited. As a result, the amount of bleed air provided to the system is minimized and the amount of cooling per pound of compressed air is also enhanced, thereby increasing the efficiency of the entire system.

In operation, compressed air bled from the compressor section 52 of the engine 50, or an auxiliary power unit, is directed through the primary heat exchanger 22, wherein it is cooled by transferring heat to the ram air traversing duct 20, and thence to the compressor 30 of the air cycle machine via duct 54. The compressor 30 increases the pressure of the bleed air input thereto. The compressed air discharging from the compressor 28 passes through the secondary heat exchanger 24, wherein it is cooled to remove the heat gained during compression by transferring heat to the ram air traversing duct 20, and thence via duct 56 to the condensing heat exchanger 36 wherein sufficient additional heat is removed from the compressed air being conditioned so as to cause water vapor therein to condense. The compressed air then passes through the water collector 38 which removes any condensed water droplets from the air. The removed water may be directed through a line (not shown) to spray nozzles 26 for injection into the ram air traversing the primary and secondary heat exchangers as discussed hereinbefore. The dehumidified, partially cooled compressed air then passes into the filtration system 18, wherein the compressed air passes through the aerosol particulate collector 40 and thence to whichever of the filters 44, 46 which is in operation for removal of any biological, chemical or nuclear contaminants therein.

The contaminated air is fed by valve 50 to the bed of filter 44 until that bed can no longer absorb contaminants or until a reasonably safe time period of operation has passed, while the other bed of filter 46 is out of operation and being cleansed so as to remove the accumulated contaminants and regenerate the bed. At that point, the valve 50 is rotated by the controller 60 to divert the flow of contaminated air away from the bed 44 and feed the contaminated air to the bed 46 which, having been cleansed, is now brought into operation to absorb contaminants from the incoming compressed air. The formerly operative bed 44 is taken out of operation for cleansing as discussed hereinbefore.

The decontaminated air passing from the filters is directed through valve 48 by the controller 60 to discharge from the filtration system 18 and pass to the turbine 32 via duct 62. The turbine extracts not only energy from the decontaminated compressed air to drive the fan 28 and the compressor 30, but also through expansion cools the air and reduces the pressure of the air thereby completing the conditioning of the air. A portion of the conditioned air discharged from the turbine 32 is directed via duct 82 to pass into the occupant enclosure 80 to ensure a comfortable, safe atmosphere therein. For temperature control purposes, a controlled portion of the air within the occupant enclosure is recirculated through duct 84, while the remainder thereof is vented overboard through duct 86 and replaced by incoming conditioned air via duct 82.

The remainder of the conditioned air discharged from the turbine 32 is directed via duct 64 to and through the load heat exchanger 16 wherein it absorbs heat from air circulating through the load heat exchanger 16 from the closed environment of the equipment bay 34 as discussed hereinbefore. After traversing the load heat exchanger 16, this portion of the conditioned air then passes via duct 66 through the condensing heat exchanger 36, wherein the conditioned air absorbs heat through indirect heat exchange from the contaminated, moisture bearing, compressed air passing through duct 56 on its way to the filtration system 18 for decontamination, thereby cooling the contaminated, moisture bearing, compressed air and adjusting the temperature of the conditioned air passing through duct 66 so that this air is the proper temperature, as required by the filtration system 18, for purging the beds of filters 44 and 46 of their contaminants. A portion of this warmer conditioned air may also be used to provide make-up air to the closed environment via duct 68. A flow restriction means 85, such as for example an orifice or a reduction in duct diameter, may be included in the flow duct 82 upstream of the enclosure 80 to add an additional pressure drop to the conditioned air flow passing through duct 82 to the enclosure 80 so as to induce adequate conditioned air flow through duct 64 for use as purge air in cleansing the beds of filters 44, 46.

The relatively low pressure, warmer conditioned air passing via duct 72 into the filtration system 18 serves as purge air for backflowing through the beds for cleansing the beds of contaminants accumulated therein. While the compressed air passing to the turbine 32 is being decontaminated by passing through the bed of one of the filters, the other filter is being stripped of its contaminants by directing the relatively low pressure, warmer conditioned air from duct 72 to backflow as purge air through the bed being regenerated. The purge air, along with the decontaminates entrained therein, discharging from the bed is directed via valve 48 through duct 74 for subsequent discharge to the atmosphere. The controller 60 operates the valves 48 and 50 within the filtration 18 in a manner well known in the art. Moreover, the controller 60 regulates the amount of make-up air passing to the closed environment of the equipment bay 34 via valve 70 as is well known in the art.

In accordance with the present invention, the contaminant laden purge air discharging from the filtration system 18 through duct 74 is not discharged directly overboard as in the prior art, but rather is discharged into the ram air duct 20 into a region 77 thereof located downstream of the heat exchange means 14 and upstream of the fan 28 located at the outlet end of the duct 20. So located, the region 77 comprises a subatmospheric pressure region since the ram air drawn via the fan 28 from the atmosphere through the ram air duct 20 will experience a pressure drop as it traverses the heat exchange means 14 and will therefore be at subatmospheric pressure as it traverses the region 77. The fan 28 will impart sufficient pressure boost to the ram air and the contaminated purge air injected into region 77 to vent the combined flow to the atmosphere. Discharging the purge air into a subatmospheric pressure region, permits the use of a less restrictive flow restriction means 85, i.e. a flow restriction means producing a lesser pressure drop, in duct 82, while still ensuring that adequate air flow is induced in duct 64 for purging. This reduction in cooling circuit pressure drop results in a reduced turbine backpressure and increased cooling capacity for a given size heat exchanger means 14. Alternatively, the same cooling capacity may be achieved while using a heat exchanger means 14 of reduced size, thereby providing an attractive weight savings on aircraft applications.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

I claim:

1. An environmental control system for providing filtered, conditioned air drawn from ambient air from the atmosphere outside an enclosure to the enclosure, said system including a regenerable filtration means for removing contaminants from the air being conditioned, said filtration means being regenerated by passing a flow of purge air therethrough to entrain contaminants accumulated in said filtration means, said system characterized by means for discharging the purge air from said filtration means into a subatmospheric pressure region defined by a ram air duct having an inlet opening to the atmosphere and an outlet opening to the atmosphere so that the subatmospheric pressure region is between said inlet and said outlet.

2. An environmental control system for providing filtered, conditioned air to an environment, said system utilizing an air cycle machine for conditioning the air, a ram air duct having an inlet opening to the atmosphere and an outlet opening to the atmosphere, and a regenerable filtration means for removing contaminants from the air being conditioned, said air cycle machine having a compressor, a turbine and a fan, wherein the air being conditioned is pressurized by said compressor, thereafter passed through the filtration means, thereafter communicated to and expanded in said turbine thereby conditioning the air by cooling the air and reducing the pressure of the air, and a portion of the conditioned air is thereafter passed through said filtration means as purge air to entrain contaminants accumulating in said filtration means, said fan disposed in the ram air duct for drawing a flow of ram air therethrough, said system characterized by means for discharging the purge air from said filtration means into a subatmospheric pressure region in the ram air duct.

3. A method of operating an environmental control system for providing filtered, conditioned air drawn from ambient air from the atmosphere outside an enclosure to the enclosure, said system including an air cycle machine having a turbine, a compressor and a fan, and a regenerable filtration means for removing contaminants from the air being conditioned, said method including the steps of passing a flow of purge air through said filtration means to entrain contaminants accumulated in said filtration means, and subsequently discharging the contaminant laden purge air to the atmosphere, said method characterized by the further steps of discharging the contaminant laden purge air from said filtration means into a subatmospheric pressure region defined by a ram air duct having an inlet opening to the atmosphere and an outlet opening to the atmosphere so that the subatmospheric pressure region is between said inlet and said outlet prior to the contaminant laden purge air being vented to the atmosphere.

4. A method as recited in claim 3 wherein the step of venting the contaminant laden purge air to the atmosphere comprises passing the contaminant laden purge air through the fan of the air cycle machine.

5. An environmental control system for providing filtered, conditioned air drawn from ambient air from the atmosphere outside an enclosure to the enclosure, comprising a regenerable filtration means for removing contaminants from the air being conditioned, said filtration means being regenerated by passing a flow of purge air therethrough to entrain contaminants accumulated in said filtration means, a subatmospheric pressure region defined by a ram air duct having an inlet opening to the atmosphere and an outlet opening to the atmosphere so that the subatmospheric pressure region is between said inlet and said outlet between the enclosure and the atmosphere, and a duct affixed between the enclosure and the subatmospheric pressure region so that the purge air is discharged through the duct into the subatmospheric pressure region for venting therefrom to the atmosphere.

6. The environmental control system of claim 5, wherein the ram air duct includes a fan adjacent the outlet for drawing ram air from the atmosphere into said inlet of the ram air duct.

7. The environmental control system of claim 6, wherein the ram air duct includes heat exchange means adjacent its inlet so that the ram air drawn into the ram air duct traverses said heat exchange means.

8. The environmental control system of claim 5, wherein the system also includes an air cycle machine for conditioning the air, said air cycle machine having a compressor, a turbine and a fan, wherein the air being conditioned is pressurized by said compressor, thereafter passed through the filtration means, thereafter communicated to and expanded by said turbine thereby conditioning the air by cooling the air and reducing the pressure of the air, and a portion of the conditioned air is thereafter passed through said filtration means as said flow of purge air.

9. The environmental control system of claim 8, wherein the subatmospheric pressure region is defined by a ram air duct having an inlet opening to the atmosphere and an outlet opening to the atmosphere so that the subatmospheric pressure region is between said inlet and said outlet.

10. The environmental control system of claim 9, wherein the ram air duct houses said fan adjacent its outlet for drawing ram air from the atmosphere into said inlet of the ram air duct.

11. The environmental control system of claim 10, wherein the ram air duct includes heat exchange means adjacent its inlet so that the ram air drawn into the ram air duct traverses said heat exchange means.

* * * * *